US012809068B2

(12) United States Patent
Guimard et al.

(10) Patent No.: US 12,809,068 B2
(45) Date of Patent: Nov. 24, 2026

(54) PROJECTION ASSEMBLY FOR A HEAD-UP DISPLAY (HUD) WITH P-POLARIZED RADIATION

(71) Applicant: SAINT-GOBAIN GLASS FRANCE, Courbevoie (FR)

(72) Inventors: Denis Guimard, Herzogenrath (DE); Romain Hivet, Herzogenrath (DE); Jan Hagen, Herzogenrath (DE); Bernard Nghiem, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 194 days.

(21) Appl. No.: 18/729,824

(22) PCT Filed: Jan. 17, 2023

(86) PCT No.: PCT/EP2023/050958
§ 371 (c)(1),
(2) Date: Jul. 17, 2024

(87) PCT Pub. No.: WO2023/143959
PCT Pub. Date: Aug. 3, 2023

(65) Prior Publication Data

US 2025/0155614 A1 May 15, 2025

(30) Foreign Application Priority Data

Jan. 25, 2022 (EP) .................................... 22153109

(51) Int. Cl.
*G02B 5/08* (2006.01)
*G02B 27/01* (2006.01)
*G03B 21/62* (2014.01)

(52) U.S. Cl.
CPC ....... *G02B 5/0875* (2013.01); *G02B 27/0101* (2013.01); *G03B 21/62* (2013.01); *G02B 2027/0194* (2013.01)

(58) Field of Classification Search
CPC .............. G02B 5/0875; G02B 27/0101; G03B 21/62
See application file for complete search history.

(56) References Cited

U.S. PATENT DOCUMENTS

2017/0024227 A1 1/2017 Akama
2021/0204366 A1 7/2021 Hagen et al.
(Continued)

FOREIGN PATENT DOCUMENTS

CN 106054487 A 10/2016
CN 113677520 A 11/2021
(Continued)

OTHER PUBLICATIONS

International Search Report as issued in International Patent Application No. PCT/EP2023/050958, dated Apr. 21, 2023.
(Continued)

*Primary Examiner* — James A Dudek
(74) *Attorney, Agent, or Firm* — CUSHMAN PARTNERS LLC

(57) ABSTRACT

A projection arrangement for a head-up display (HUD), includes a composite pane, including an outer pane and an inner pane, which are connected to one another via a thermoplastic intermediate layer and having an HUD region, and an HUD projector, which is directed toward the HUD region. The radiation of the projector is at least partially p-polarised, and the composite pane is provided with a reflective layer which is suitable for reflecting p-polarised radiation. The reflective layer includes precisely one electrically conductive layer based on silver, which layer is arranged in a planar manner between a first layer module and
(Continued)

Figure 1:
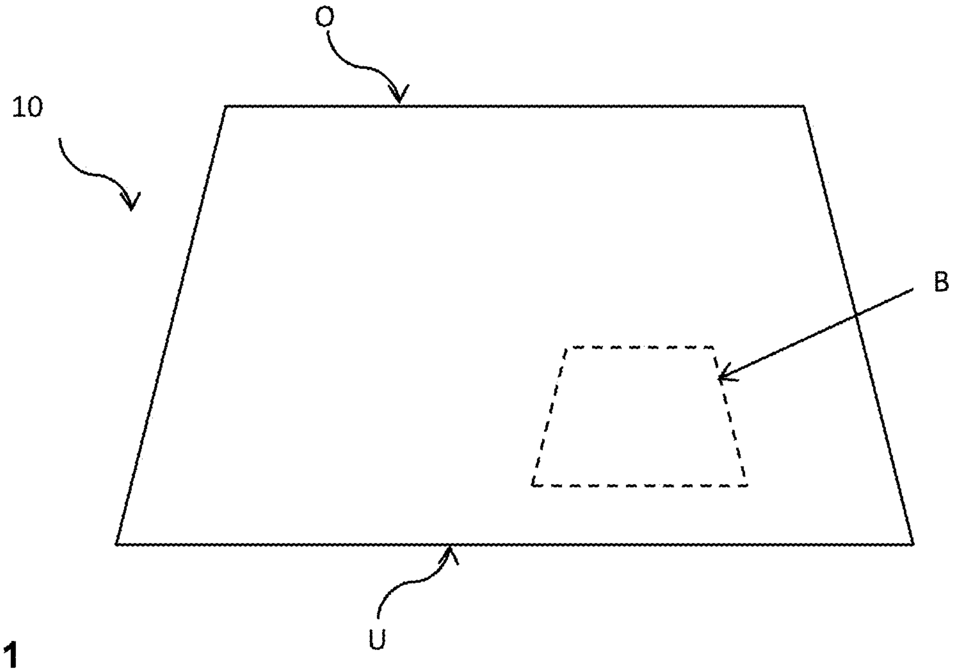

a second layer module, the first layer module is the layer module of the reflective layer closest to the HUD projector, the first layer module and the second layer module include dielectric layers or layer sequences, and the first layer module contains a layer based on a transparent conductive oxide.

20 Claims, 3 Drawing Sheets

(56) References Cited

U.S. PATENT DOCUMENTS

| | | | | |
|---|---|---|---|---|
| 2021/0316533 | A1 | 10/2021 | Fischer et al. | |
| 2022/0179208 | A1* | 6/2022 | Fischer | C03C 27/10 |

FOREIGN PATENT DOCUMENTS

| | | | |
|---|---|---|---|
| DE | 10 2014 220189 | A1 | 4/2016 |
| EP | 1 880 243 | A2 | 1/2008 |
| EP | 1 800 855 | B1 | 2/2013 |
| WO | WO 2006/122305 | A2 | 11/2006 |
| WO | WO 2009/071135 | A1 | 6/2009 |
| WO | WO 2019/046157 | A1 | 3/2019 |
| WO | WO 2019/179683 | A1 | 9/2019 |
| WO | WO 2020/094422 | A1 | 5/2020 |
| WO | WO 2020/094423 | A1 | 5/2020 |
| WO | WO 2021/004685 | A1 | 1/2021 |
| WO | WO 2021/104800 | A1 | 6/2021 |
| WO | WO 2021/105959 | A1 | 6/2021 |

OTHER PUBLICATIONS

Neumann, A., “Simulation-Based Metrology for Testing Head-Up Displays,” Dissertation at the Informatics Institute of Munich Technical University (Munich: University Library of Munich TU, 2012), in particular chapter 2 “The Head-Up Display”, (2012), Retrieved from the Internet: URL: <https://mediatum.ub.tum.de/1079689?id=1079689&change_language=en>. (English abstract on p. 5 of document).

* cited by examiner

PROJECTION ASSEMBLY FOR A HEAD-UP DISPLAY (HUD) WITH P-POLARIZED RADIATION

CROSS-REFERENCE TO RELATED APPLICATIONS

This application is the U.S. National Stage of PCT/EP2023/050958, filed Jan. 17, 2023, which in turn claims priority to European patent application number 22153109.8 filed Jan. 25, 2022. The content of these applications are incorporated herein by reference in their entireties.

The invention relates to a projection arrangement for a head-up display and use thereof.

Modern automobiles are increasingly equipped with so-called head-up displays (HUDs). With a projector, typically in the area of the dashboard, images are projected onto the windshield, reflected there, and perceived by the driver as a virtual image behind the windshield (as seen by the driver). Thus, important information can be projected into the field of vision of the driver, for example, the current travel speed, navigation messages or warnings that the driver can perceive without having to turn his gaze away from the road. Head-up displays can accordingly contribute substantially to increasing traffic safety.

HUD projectors are predominantly operated with s-polarized radiation and irradiate the windscreen with an angle of incidence of approximately 65%, which is close to the Brewster angle for an air-glass transition (56.5° for soda-lime glass). In this context, the problem arises that the projector image is reflected on both external surfaces of the windshield. As a result, in addition to the desired main image, a slightly offset secondary image also occurs, the so-called ghost image. The problem is usually mitigated by arranging the surfaces at an angle to one another, in particular by using a wedge-like intermediate layer for laminating the windshields designed as a laminated pane, so that the main image and the ghost image are superimposed on one another. Laminated glasses with wedge films for HUDs are known, for example, from WO 2009/071135 A1, EP1800855B1 or EP1880243A2.

The wedge films are costly, and therefore the production of such a laminated pane for an HUD is quite cost-intensive. There is therefore a need for HUD projection arrangements which manage with windshields without wedge films. It is thus possible, for example, to operate the HUD projector with p-polarized radiation which is not substantially reflected at the pane surfaces. As a reflective surface for the p-polarized radiation, the windscreen instead has a reflective layer. DE102014220189A1 discloses such an HUD projection arrangement which is operated with p-polarized radiation. A single metallic layer having a thickness of nm to 9 nm, for example of silver or aluminium, is proposed, inter alia, as a reflective structure. Further HUD projection arrangement with reflective coatings with respect to p-polarized radiation which have a single metallic layer are known, for example, from WO2021/004685A1 and WO2021/104800A1.

The coatings with a single metallic layer can have good reflective properties with respect to the p-polarized radiation of the projector. Frequently, however, the coating should also have reflective properties with respect to infrared solar radiation in order to prevent heating of the interior. However, the effectiveness of coatings with a single metallic layer, in particular silver layer, is very limited in this regard. An improvement would in principle be possible by selecting a very thick metallic layer. However, in this regard, the freedom of design is subject to narrow limits, because the metallic layer also reduces the transmittance in the visible spectral range, on which high demands are placed for windscreens.

Coatings with a plurality of metallic layers which are separated from one another by dielectric layers have also been proposed. For example, reference is made to WO2019046157A1, WO2019179683A1, WO2020094422A1, WO2020094423A1. By means of such coatings, better IR-reflecting properties are possible with a comparatively high transmittance in the visible spectral range. However, the deposition of such more complex coatings with a plurality of individual layers is technically complex. At the same time, these coatings with a plurality of metallic layers have worse reflection properties with respect to p-polarized radiation than do coatings with a single metallic layer.

The design of the coating also cannot be effected solely by taking into account the IR reflection and the transmittance within the visible spectral range. The use as a reflective coating for the radiation of an HUD projector places further requirements on the coating, in particular a high reflectivity with respect to p-polarized radiation in the visible spectral range and a reflection spectrum which is as smooth as possible, that is to say a reflectivity that is as constant as possible, in order to make possible a representation of the HUD projection which is as colour-neutral as possible. US201724227A1 discloses, for example, a further HUD projection arrangement with a reflective layer for p-polarised radiation which can contain a plurality of conductive silver layers, in addition, dielectric layers. However, the reflection spectrum has a clearly curved form in the relevant spectral range, so that the reflectivity is relatively strongly wavelength-dependent.

CN 113677520 A describes a composite pane which has a sun protection layer comprising three silver layers and four dielectric modules, wherein the dielectric modules are applied between the silver layers and as outer layers.

US 2021/0316533 A1 discloses a projection arrangement comprising a composite pane with an electrically conductive coating which contains three electrically conductive layers surrounded by dielectric layers, wherein the electrically conductive layers each have a thickness of 5 nm to 10 nm.

US 2021/0204366 A1 describes a pane which has an electrically conductive coating, wherein this electrically conductive coating comprises a transparent conductive oxide layer and a dielectric layer for regulating the oxygen diffusion.

CN 106054487 A is focused on a method for producing an electrochromic window, wherein the method comprises the formation of an electrochromic metal oxide layer, an ion-conducting layer and a counter-electrode layer on the substrate, whereby an oxidic conductive layer is formed in which the ion-conducting layer is oxidised as a stack of separate layers of the counter-electrode layer.

WO 2021/105959 A1 discloses a vehicle glazing with a sun protection layer which has a layer stack comprising an ITO layer, wherein a thin absorption layer of a metal alloy or a partially oxidised metal is attached to one side of the ITO layer.

WO 2021/004685 A1 discloses a projection arrangement for a head-up display comprising an HUD projector and a windscreen with a reflective layer, wherein the reflective layer comprises exactly one electrically conductive layer and also no further electrically conductive layers above or below the reflective layer.

There is a need for further improved projection arrangements for p-polarised HUDs with reflective layers. The coating should ensure a high transmittance in the visible spectral range and a high reflectivity in relation to infrared components of the solar radiation, and have a reflectivity that is high and as constant as possible with respect to the p-polarised radiation of the HUD projector in the visible spectral range. The object of the present invention is to provide such an improved projection arrangement.

The object of the present invention is achieved according to the invention by a projection arrangement according to claim 1. Preferred embodiments are apparent from the dependent claims.

The projection arrangement according to the invention for a head-up display (HUD) comprises at least one composite pane which is provided with a reflective layer, and a projector (HUD projector). As usual with HUDs, the projector irradiates a region of the composite pane where the radiation is reflected towards the viewer (driver), thereby generating a virtual image that the viewer perceives from behind the composite pane. The region of the composite pane that can be irradiated by the projector is referred to as the HUD region. The beam direction of the projector can typically be varied by mirrors, in particular vertically, in order to adapt the projection to the body size of the viewer. The area in which the observer's eyes must be located at a given mirror position is referred to as the eye-box window. This eye-box window can be displaced vertically by adjusting the mirrors, wherein the entire area accessible as a result (i.e., the superimposition of all possible eye-box windows) is referred to as the eye box. An observer located within the eye box can perceive the virtual image. This means, of course, that the observer's eyes must be located within the eye box, not, for instance, the entire body.

The technical terms used here from the field of HUDs are generally known to the person skilled in the art. For a detailed depiction, reference is made to the dissertation "Simulation-based measurement technique for testing head-up displays" by Alexander Neumann at the Institute for Informatics of the Technical University of Munich (Munich: university library of TU Munich, 2012), in particular to Chapter 2 "The Head-Up Display."

The composite pane comprises an outer pane and an inner pane which are connected to one another via a thermoplastic intermediate layer. The laminated pane is provided to separate the interior from the external environment in a window opening of a vehicle. In the sense of the invention, the term "inner pane" refers to the pane of the composite pane facing the vehicle interior. Outer pane means the pane facing the external environment.

The composite pane according to the invention is preferably a windscreen (front pane) of a vehicle on land, on the water or in the air, in particular the windscreen of a motor vehicle, for example a passenger car or lorry, or the front windscreen of an aircraft, ship or rail vehicle, in particular a train. HUDs in which the projector radiation is reflected on a windscreen in order to generate an image perceptible to the driver (observer) are particularly common. In principle, however, it is also conceivable to project the HUD projection onto other panes, in particular vehicle windows, for example onto a side pane or rear pane. By means of the HUD of a side pane, persons or other vehicles can be marked, for example, with whom/which there is a risk of collision if their position is determined by cameras or other sensors. An HUD of a rear pane can provide information for the driver during reverse travel.

The composite pane has an upper edge and a lower edge and two side edges extending between them. Upper edge means the edge intended to point upward in the installed position. Lower edge means the edge intended to point downward in the installed position. In the case of a windscreen, the upper edge is often also referred to as a roof edge and the lower edge is referred to as the motor edge.

The outer pane and the inner pane each have an outer-side and an interior-side surface and a peripheral side edge extending between them. In the context of the invention, the outer surface means the main surface which is provided to face the external environment when installed. In the context of the invention, the interior-side surface means the main surface which is intended to face the interior space when installed. The interior-side surface of the outer pane and the outer surface of the inner pane face one another and are connected to one another by the thermoplastic intermediate layer.

The projector is directed toward the HUD region of the composite pane. The radiation of the projector is at least partially, preferably predominantly, particularly preferably essentially completely p-polarised. The reflective layer is suitable for reflecting p-polarised radiation. As a result, a virtual image is generated from the projector radiation which the driver of the vehicle can perceive from behind the composite pane.

The reflective layer is a thin-film layer, i.e., a layer sequence of thin individual layers, which can also be referred to as thin-film stack. The reflective layer comprises exactly one electrically conductive layer based on silver (hereinafter also referred to as a silver layer) and two layer modules. The layer modules and the electrically conductive layer are arranged alternately, so that the electrically conductive layer is arranged between the two layer modules. The reflective layer thus has the structure "layer module—electrically conductive layer—layer module" from bottom to top, wherein further layers can follow above or below, but no electrically conductive layer based on silver.

The layer module denotes a single layer or a plurality of layers which are present in addition to the precisely one silver layer, and are arranged adjacent thereto. According to the invention, the silver layer is arranged between two layer modules. The layer module, which represents the layer of the reflective layer closest to the HUD projector, is referred to as the first layer module, whereas the layer module which is attached to the surface of the silver layer facing away from the HUD projector is referred to as the second layer module. Coatings comprising silver layers between dielectric layer modules are generally known, wherein in a conventional manner the layer modules comprise exclusively dielectric layers or layer sequences. In contrast thereto, according to the invention, at least the first dielectric layer module comprises a layer based on a transparent electrically conductive oxide (TCO, transparent conductive oxide), which is also referred to as TCO layer.

The first and the second layer modules serve for corrosion protection of the silver layer and have an influence on the optical properties of the reflective layer. To date, the view has appeared to predominate that these layer modules need to be designed exclusively as dielectric layers or layer sequences. The inventors have recognised that the targeted introduction of a TCO layer into the first layer module is advantageous for reducing the energy input into the vehicle interior. TCO layers have reflective properties in the infrared spectral range (IR range) and are largely transparent in the visible range of the light spectrum. The desired reduced energy input is thereby achieved without the light transmittance being significantly reduced. The transmittance-reducing effect is in particular less than that of the silver layers. In addition, the layer construction according to the invention makes possible reflective layers with a high and comparatively constant reflectivity with respect to p-polarised radiation in the visible spectral range, whereby an intensive and colour-neutral HUD projection can be realized. These are great advantages of the present invention.

In a preferred embodiment, the layer of the transparent electrically conductive oxide has a refractive index of from 1.6 to 2.0, preferably from 1.7 to 1.9, particularly preferably from 1.7 to 1.8, at a wavelength of 550 nm. The inventors have found that TCO layers with refractive indices of this type are particularly suitable for achieving a reflective layer with good reflective properties with respect to p-polarised radiation and good infrared-reflecting properties.

Contained within at least within the first layer module is, according to the invention, at least one TCO layer, preferably precisely one TCO layer. In a particularly preferred embodiment, the TCO is indium tin oxide (ITO). ITO has particularly good IR-reflective properties and can be deposited well, in particular by means of cathode sputtering. In addition, ITO exhibits advantageous interactions with silver layers. Silver layers can thus be deposited on ITO layers with high quality due to a very similar crystal structure. As further suitable transparent conductive oxides within the scope of the invention, indium zinc mixed oxide (IZO), fluorine-doped tin oxide (FTO, SnO2:F), aluminium-doped zinc oxide (AZO, ZnO:Al), gallium-doped zinc oxide (GZO, ZnO:Ga), antimony-doped tin oxide (ATO, $SnO_2$:Sb) and/or niobium titanium oxide ($TiO_2$:Nb) can also be used.

The TCO layer is preferably designed to be substoichiometric, i.e., has a substoichiometric oxygen content. Oxygen is then absorbed, for example during a thermal treatment, by the substoichiometric TCO layers and cannot react with the silver layer.

In a preferred embodiment of the projection arrangement, the at least one TCO layer is an ITO layer which is deposited in the process gas by means of physical vapour deposition with an oxygen content of 0% volume fraction to 5% volume fraction, preferably with an oxygen content of below 1% volume fraction. The inventors have found that reflective layers according to the invention with an ITO layer deposited under these conditions have an improved IR reflection, and the heat transmittance through the composite pane is thereby further reduced.

The reflective layer preferably comprises at least one dielectric barrier layer directly adjacent to the TCO layer, which barrier layer inhibits the diffusion of oxygen. In this way, the reaction of the TCO layer with oxygen is avoided. Such a barrier layer is particularly advantageous if the TCO layer is provided in the vicinity of a glass surface. If a glass pane on which the reflective layer is applied is subjected to a thermal bending process or prestressing process, the glass pane will release oxygen, which can lead to an oxidation of the TCO layer to a certain extent. A barrier layer between TCO layer and glass pane reduces the diffusion of oxygen from the glass into the TCO layer, so that the oxidation of the TCO layer is prevented. The barrier layers for reducing the oxygen diffusion are dielectric layers. Nitride layers and/or oxide layers, preferably $Si_3N_4$, $SiO_2$ and/or SiON have proven to be particularly suitable.

At least the first layer module comprises at least one TCO layer and dielectric layers or layer sequences. In a preferred embodiment, the second layer module does not comprise a TCO layer and exclusively dielectric layers or layer sequences. Dielectric layers can generally be deposited cost-effectively and have advantageous properties, for example a barrier effect against the diffusion of alkali ions. In addition, a reflective layer having at least one TCO layer and dielectric layers or layer sequences within the first layer module and without TCO layer within the second layer module made of dielectric layers or layer sequences has proven to be particularly advantageous with regard to good reflective properties for p-polarised light. This is decisive for the use of the composite pane with reflective layer as an HUD projection surface. In a further preferred embodiment, both the first layer module and the second layer module each contain dielectric layers or layer sequences and in each case at least one TCO layer. As a result, the energy input through the pane is further reduced compared to a pane without this additional TCO layer in the second layer module. However, the inventors were able to determine that the reflective properties of the composite pane for p-polarised light in each case with a TCO layer in the first and second layer modules, are somewhat reduced. In this respect, the TCO layer within the second layer module is optional, wherein in the specific application it is to be decided whether a reduction in the reflective properties for p-polarised light in favour of a lower energy input is acceptable. Because an advantageous reduction of the energy input is already achieved to an acceptable degree with only one TCO layer within the first layer module, TCO layers within the second layer module are particularly preferably dispensed with.

According to the inventive idea, the first layer module comprises at least one TCO layer and in addition the dielectric layers which conventionally form the layer modules. The first layer module thus contains the TCO layer in addition to the dielectric layers. The first layer module is the layer module of the reflective layer which is arranged closest to the HUD projector of the projection arrangement. The distance between a layer module and the HUD projector is determined along the surface normal of the reflective layer, wherein according to the definition the layer module which is at a shorter distance from the HUD projector is the first layer module, and the layer module with a greater distance from the HUD projector is referred to as the second layer module. In the installed state of the projection arrangement according to the invention, the HUD projector is arranged in a vehicle within the vehicle interior. Accordingly, the first layer module forms the layer of the reflective layer closest to the vehicle interior.

According to the invention, at least one TCO layer is applied within the first layer module. Preferably, exactly one TCO layer is located within the first layer module. Within the first layer module, this TCO layer can assume all of the possible positions below, above or between the dielectric layers of the first layer module. Particularly preferably, the TCO layer within the first layer module represents the layer of the reflective layer closest to the vehicle interior and the HUD projector. This is advantageous with regard to improved reflectivity of the coating for p-polarised light. If the TCO layer as the layer closest to the vehicle interior is directly adjacent to a glass pane, the above-described barrier layer for reducing the oxygen diffusion is preferably introduced between the glass pane and the TCO layer, which prevents a direct contact between the glass pane and TCO layer.

Furthermore, the position of the TCO layer within the layer stack of the reflective layer can have an advantageous influence on the silver layer of the coating. A TCO layer below the silver layer offers the advantage that silver layers form particularly good layer properties when they are deposited on TCO layers due to a similar crystal structure. A TCO layer above the silver layer offers the advantage that its degree of oxidation can be adjusted well, which in turn exerts an influence on its barrier effect against oxygen and thus on the oxidation of the silver layer, in particular during a thermal treatment. In particular, a substoichiometric TCO layer can prevent the silver from corroding because the oxygen required for this is absorbed by the oxygen-deficient TCO layer. A dielectric layer module below the silver layer also has the advantage that it can prevent the diffusion of alkali ions from the glass into the silver layer more effectively than can a TCO layer module.

The reflective layer comprises exactly one silver layer and two layer modules, namely one layer module above and one below the silver layer. The reflective layer thus does not contain more than one silver layer, and no further silver layers are arranged above or below the reflective layer. It is a particular advantage of the invention that the required properties can be achieved with a simple structure with only one silver layer. As a result, the deposition of the coating is designed to be comparatively technically simple and cost-effective, and the individual silver layer does not degrade the light transmittance excessively. The reflective layer has the following basic layer structure, starting from the substrate on which it is deposited ("from bottom to top"):

layer module
electrically conductive layer based on silver
layer module

Depending on the position of the substrate, the coating modules are defined as a first layer module, which is at a shorter distance from the vehicle interior, and as a second layer module, which is at a greater distance from the vehicle interior.

The reflective layer is preferably applied to one of the surfaces of the two panes facing the intermediate layer, i.e., the interior-side surface of the outer pane or the outer-side surface of the inner pane. Alternatively, the reflective layer can also be arranged within the thermoplastic intermediate layer, for example applied to a carrier film which is arranged between two thermoplastic laminated films. The order in which the layers of the reflective layer are applied to the underlying substrate is thus dependent on the function of the substrate as outer pane, inner pane or the intermediate layer. If the reflective layer is attached to the outer-side surface of the inner pane, the first layer module will be deposited on this surface, followed by the silver layer situated above it and the second layer module as a termination of the layer stack. On the other hand, a reflective layer applied to the interior-side surface of the outer pane is applied such that the second layer module is deposited on this pane surface, followed by the silver layer, and the layer stack terminates with the first layer module. In this way, irrespective of the position of the reflective layer, it is ensured that the first layer module with TCO layer enclosed therein forms the layer module of the reflective layer closest to the vehicle interior. Particularly preferably, the reflective layer is applied to the outer-side surface of the inner pane. This is advantageous with regard to the highest possible HUD image quality.

Preferably, the reflective layer consists of the silver layer, the first layer module, and the second layer module, and has no further layers. An exception thereto is the above-described barrier layers for reducing the oxygen diffusion, and very thin blocker layers with a thickness of less than 1 nm, which can optionally be present between the silver layer and the adjacent layer modules. The blocker layers comprise metals, metal oxides, and/or metal nitrides. In addition to the silver layer, the layer modules and the optionally present barrier layers, the reflective layer thus does not have any further layers with a thickness of more than 1 nm. In other words, the reflective layer preferably consists of the silver layers and the layer modules and optional barrier layers and optional blocker layers.

Unless otherwise indicated, the specification of layer thicknesses or thicknesses refers to the geometric thickness of a layer.

If a first layer is arranged above a second layer, this means, in the sense of the invention, that the first layer is arranged further away from the substrate on which the coating is applied than the second layer. If a first layer is arranged below a second layer, this means, in the sense of the invention, that the second layer is arranged further away from the substrate than the first layer.

If a layer is formed "on the basis of" a material, the layer consists predominantly of this material, in particular substantially of this material, in addition to any impurities or doping.

The electrically conductive layer is formed on the basis of silver. The electrically conductive layer preferably contains at least 90 wt. % silver, particularly preferably at least 99 wt % silver, and very particularly preferably at least 99.9 wt % silver. The silver layer can have dopings, e.g., palladium, gold, copper, or aluminium. The thickness of the silver layer is preferably at least 9 nm, particularly preferably at least 12 nm. The thickness of the silver layer is preferably at most 25 nm. Particularly advantageous properties of the reflective layer can be achieved in this region for the thickness. The silver layer is on the one hand thick enough to have significant IR-reflective properties to enable heating of the pane and not to lead to dewetting problems during a thermal treatment. An island-like accumulation of the silver instead of a homogeneous layer is referred to here as dewetting and can occur with very thin silver layers. On the other hand, the silver layer is thin enough to ensure high light transmittance. The desired reflective properties with respect to p-polarised radiation can likewise advantageously be realised in this region for the thickness of the silver layer.

The thickness of the at least one TCO layer is preferably from 20 nm to 150 nm, preferably from 60 nm to 100 nm. Good results are thus achieved with regard to the IR-reflective properties and the reflective properties with respect to the p-polarised radiation of the HUD projector. The TCO layer is in particular thin enough to not reduce the light transmittance to a critical extent and on the other hand is thick enough to effectively protect the silver layer from corrosion. If the reflective layer has a plurality of TCO layers, the aforementioned preferred regions apply for each of the TCO layers.

In an advantageous embodiment, the reflective layer comprises at least one blocker layer based on a metal, a metal alloy and/or a completely or partially oxidised and/or nitrided layer based on a metal. The blocker layer is preferably in direct contact with the silver layer. The blocker layer is preferably arranged above the silver layer. The blocker layer is then arranged between the silver layer and the layer module located above it and serves for the oxidation protection of the silver layer, in particular in the case of thermal treatments of the coated pane, as typically occur within the context of bending processes. Alternatively or additionally, a blocker layer can also be present below the silver layer. The blocker layer is then arranged between the silver layer and the layer module situated thereunder. Such a blocker layer below the silver layer improves the adhesion of the silver layer. The blocker layer preferably has a thickness of less than 1 nm, particularly preferably 0.1 nm to 0.5 nm. The blocker layer can be formed, for example, based on nickel (Ni), chromium (Cr), niobium (Nb), titanium (Ti) or mixtures or alloys thereof. The blocker layer is preferably formed based on titanium or a nickel-chromium alloy. The blocker layer can be completely or partially oxidised or nitrided.

The optical thickness of the dielectric layer module is preferably from 30 nm to 150 nm, particularly preferably from 60 nm to 120 nm, very particularly preferably from 70 nm to 100 nm. Particularly advantageous optical properties of the reflective layer are thereby achieved. The dielectric layers have an anti-reflective effect with respect to the silver layer, so that the light transmittance is increased and influence the reflection spectrum in relation to the radiation of the HUD projector. In the aforementioned range for the optical thickness, an advantageous light transmittance is achieved, and a pronounced and uniform (colour-neutral) reflection with respect to the radiation of the HUD projector is achieved. The optical thickness is the product of the geometric thickness and the refractive index (at 550 nm). The optical thickness of a layer sequence is calculated as the sum of the optical thicknesses of the individual layers.

The dielectric layer modules can be designed as dielectric individual layers or as dielectric layer sequences. The dielectric layers can be formed, for example, on the basis of silicon oxide, silicon nitride, zinc oxide, tin oxide, tin-zinc oxide, silicon-metal mixed nitrides such as silicon-zirconium nitride, zirconium oxide, niobium oxide, hafnium oxide, tantalum oxide, tungsten oxide, or silicon carbide.

In an advantageous embodiment, the reflective layer does not comprise any dielectric layers the refractive index of which is less than 1.9. All dielectric layers of the reflective layer thus have a refractive index of at least 1.9. Because for low-refractive layers with a refractive index of less than 1.9, silicon oxide layers which have low deposition rates in magnetic-field-assisted cathode deposition can be considered in particular, the reflective layer according to the invention can thus be produced quickly and cost-effectively.

In the context of the present invention, refractive indices are in all cases specified in relation to a wavelength of 550 nm. The refractive index can be determined, for example, by ellipsometry. Ellipsometers are commercially available—for example, from the Sentech company.

The first layer module and the second layer module preferably comprise one or more of the following layers:

- an anti-reflective layer with a refractive index of at least 1.9,
- a refractive-index-enhancing layer with a refractive index of at least 2.1,
- a matching layer.

In an advantageous embodiment, the first layer module and/or the second layer module comprise a dielectric layer, which can be referred to as an anti-reflective layer, and preferably based on an oxide, for example tin oxide, and/or a nitride, for example silicon nitride, particularly preferably based on silicon nitride. Silicon nitride has proven useful due to its optical properties, its simple availability, and its high mechanical and chemical stability. The silicon is preferably doped, for example with aluminium or boron. If the dielectric layer sequence within the uppermost layer module is above the silver layer, the anti-reflective layer will preferably be the uppermost layer of the layer sequence in the case of a layer sequence. In other cases (dielectric layer module as the lowest layer module), the anti-reflective layer is preferably the lowest layer of the layer sequence in the case of a layer sequence. In addition to the advantageous optical properties, such anti-reflective layers, in particular based on silicon nitride, have a good barrier effect against the diffusion of ions (for example alkali ions from the glass panes), so that the anti-reflective layer chemically protects the functional silver layer. If the lowermost layer of a lower layer module, i.e., the layer which is in direct contact with the substrate, is a TCO layer, it will be possible for the anti-reflective layer to be dispensed with. If the substrate is glass, a barrier layer for reducing the oxygen diffusion will preferably be introduced between the TCO layer and the glass surface.

In addition to the anti-reflective layer, further dielectric layers can optionally be present, preferably those having a refractive index of at least 1.9. In a particularly advantageous embodiment, the first layer module and/or the second layer module comprise a dielectric matching layer which improves the reflectivity of the silver layer. The matching layer is preferably formed based on zinc oxide, particularly preferably zinc oxide $ZnO_{1-\delta}$ where $0 \leq \delta \leq 0.01$. The matching layer further preferably contains dopants. The matching layer can, for example, contain aluminium-doped zinc oxide (ZnO:Al). The zinc oxide is preferably deposited substoichiometrically with respect to the oxygen in order to avoid a reaction of excess oxygen with the silver-containing layer. The matching layer is preferably arranged between the silver layer and the anti-reflective layer. The matching layer is advantageous with regard to the crystal structure of the silver layer above. In addition, it can protect the silver layer from corrosion, in particular if it is deposited substoichiometrically, and consequently is able to absorb excess oxygen and prevent it from reacting with the silver layer.

The dielectric layer sequence can also comprise a refractive-index-enhancing layer which has a higher refractive index than the anti-reflective layer. The optical properties can thereby be further improved and fine-tuned, in particular the reflective properties. The refractive-index-enhancing layer in particular brings about a better anti-reflective effect of the silver layer, so that the light transmittance is increased. The refractive-index-enhancing layer preferably has a refractive index of at least 2.1. The refractive-index-enhancing layer is preferably based on a silicon-metal mixed nitride such as a mixed silicon-zirconium nitride, silicon-titanium mixed nitride or silicon-hafnium mixed nitride, particularly preferably silicon-zirconium mixed nitride. The proportion of zirconium is preferably between 15 and 45 wt. %, particularly preferably between 15 and 30 wt. %. Tungsten oxide ($WO_3$), niobium oxide ($Nb_2O_5$), bismuth oxide ($Bi_2O_3$), titanium oxide ($TiO_2$) and/or aluminium nitride (AlN), to name a few examples, come into consideration as alternative materials. The refractive-index-enhancing layers are preferably arranged between the anti-reflective layer and the silver layer or between the matching layer (if present) and the anti-reflective layer.

The thickness of the matching layer, if there is one, is preferably from 5 nm to 20 nm, particularly preferably from 8 nm to 12 nm. The thickness of the refractive-index-enhancing layer is preferably from 5 nm to 20 nm, particularly preferably from 8 nm to 12 nm. The thickness of the anti-reflective layer is preferably selected such that overall an optical thickness of the entire layer sequence is achieved in the aforementioned preferred ranges. If, in addition to the anti-reflective layer, both a matching layer and a refractive index enhancing layer are present, the thickness of the anti-reflective layer is particularly preferably from 10 nm to 40 nm.

In a preferred embodiment, the second layer module has a dielectric layer sequence which—apart from said anti-reflective layer, optional refractive-index-enhancing layer, and optional matching layer—does not have any further layers. If the second layer module does not comprise any TCO layers, it will consist of said layers. The first layer module preferably has a dielectric layer sequence which contains at least one of the layers from the group of anti-reflective layer, refractive-index-increasing layer and matching layer, and—apart from the anti-reflective layer, the refractive-index-enhancing layer and the matching layer—does not have any further layers. The first layer module furthermore preferably has precisely one TCO layer and optionally a barrier layer, so that the first layer module preferably consists of the dielectric layer sequence, the TCO layer, and optionally a barrier layer.

The materials mentioned in the present description can be deposited stoichiometrically, substoichiometrically or super-stoichiometrically. The materials can comprise dopants, in particular aluminium, boron, zirconium or titanium. Due to the dopants, dielectric materials can be provided with a certain electrical conductivity. A person skilled in the art will nevertheless identify them as dielectric layers in terms of their function, as is customary in the field of thin layers. The material of the dielectric layers preferably has an electrical conductivity (reciprocal of the specific resistance) of less than $10^{-4}$ S/m. The material of the electrically conductive layers (particularly TCO layers, silver layer) preferably has an electrical conductivity of greater than $10^{4}$ S/m.

In one possible embodiment, the first layer module and/or the second layer module comprise precisely one dielectric layer, preferably an anti-reflective layer with a refractive index of at least 1.9, particularly preferably based on silicon nitride. The thickness of the anti-reflective layer is preferably from 25 nm to 75 nm, particularly preferably from 30 nm to 60 nm, very particularly preferably from 35 nm to 50 nm.

In a further embodiment of the invention, the first layer module and/or the second layer module comprise exactly two dielectric layers, preferably an anti-reflective layer and a matching layer with a refractive index of in each case at least 1.9. The anti-reflective layer is particularly preferably designed based on silicon nitride, the matching layer based on zinc oxide. The thickness of the matching layer is preferably from 5 nm to 20 nm, particularly preferably from 8 nm to 12 nm. The thickness of the anti-reflective layer is preferably selected such that the dielectric layer module overall has an optical thickness of 50 nm to 150 nm, particularly preferably of 60 nm to 120 nm, very particularly preferably of 70 nm to 100 nm. The matching layer is preferably arranged between the anti-reflective layer and the silver layer. In the preferred case of a single TCO layer in the first layer module, particularly preferred layer sequences emerge starting from the substrate ("from bottom to top"):

- TCO layer—anti-reflective layer—matching layer—silver layer—matching layer—anti-reflective layer, for a reflective layer on the outer-side surface of the inner pane
- anti-reflective layer—matching layer—silver layer-matching layer—anti-reflective layer—TCO layer, for a reflective layer on the interior-side surface of the outer pane The anti-reflective layer adjacent to the TCO layer can also be dispensed with, wherein optionally a barrier layer is provided on the surface of the TCO layer facing away from the matching layer.

In a further embodiment of the invention, the first layer module and/or the second layer module comprise exactly three dielectric layers, preferably an anti-reflective layer with a refractive index of at least 1.9, a refractive-index-enhancing layer with a refractive index of at least 2.1, and a matching layer with a refractive index of at least 1.9. The anti-reflective layer is particularly preferably designed based on silicon nitride, the refractive-index-enhancing layer based on a silicon-metal mixed nitride (such as silicon-zirconium mixed nitride, silicon-titanium mixed nitride or silicon-hafnium mixed nitride), the matching layer based on zinc oxide. The thickness of the matching layer and of the refractive-index-enhancing layer is particularly preferably in each case from 5 nm to 20 nm, in particular from 8 nm to 12 nm. The thickness of the anti-reflective layer is preferably selected such that the dielectric layer module overall has an optical thickness of 50 nm to 150 nm, particularly preferably of 60 nm to 120 nm, very particularly preferably of 70 nm to 100 nm. It is very particularly preferably from 10 nm to 40 nm. The matching layer preferably is at the shortest distance from the adjacent silver layer, while the refractive-index-enhancing layer is arranged between the matching layer and the anti-reflective layer. In the preferred case of a single TCO layer within the first layer module, particularly preferred layer sequences emerge from the substrate ("from bottom to top"):

- anti-reflective layer-refractive-index-enhancing layer-matching layer-silver layer-matching layer-refractive-index-enhancing layer-anti-reflective layer-TCO layer, for a reflective layer on the interior-side surface of the outer pane
- TCO-layer-anti-reflective layer-refractive index-enhancing layer-matching layer-silver layer-matching layer-refractive-index-enhancing layer-anti-reflective layer, for a reflective layer on the outer-side surface of the inner pane The anti-reflective layer adjacent to the TCO layer can also be dispensed with, wherein optionally a barrier layer is provided on the surface of the TCO layer facing away from the matching layer.

In the three embodiments described above, the layer sequences preferably consist exclusively of the aforementioned layers, wherein additionally optionally between the silver layer and the above and/or the underlying layer module a blocker layer with a thickness of less than 1 nm is present. The blocker layer is preferably arranged directly above the silver layer, where it is particularly effective. An additional blocker layer can optionally be arranged directly below the silver layer.

With the coating according to the invention, advantageous reflective properties with respect to p-polarised radiation can be realized, so that a high-intensity HUD projection is enabled. The integrated light reflection of the composite pane with respect to p-polarised radiation, measured with a p-polarised light source of light type A at an angle of incidence of 65° and a viewing angle of 65°, in each case with respect to the interior-side surface normal, is preferably at least 10%, particularly preferably at least 15%, very particularly preferably at least 20%. The surface normal on the interior side is the surface normal of the interior-side surface of the inner pane. The light reflection can therefore also be referred to as an interior-side light reflection. The angle of incidence of 65° corresponds to irradiation with conventional HUD projectors. The light reflection is measured at a point within the HUD region, preferably in the geometrical centre of the HUD region.

In order to achieve a display of the HUD projection that is as colour-neutral as possible, the reflection spectrum should be as uniform as possible in the visible spectral range. This is the case in particular if the reflection colour in the La*b* colour spectrum has an a* value and a b* value, the magnitude of which is less than 5. Here too, the reflection colour is measured with a p-polarised light source of light type A at an angle of incidence of 65° and a viewing angle of 65°, in each case relative to the interior-side surface normal.

In addition, the coating according to the invention effectively reduces the heat input into vehicle interior due to the TCO layer additionally present with the silver layer, which represents a main advantage of the present invention over the prior art. The total radiated solar energy, expressed as a TTS value in accordance with ISO 13837, is preferably at most 55%.

The reflective layer is transparent, which in the context of the invention means that it has an average transmittance in the visible spectral range of at least 70%, preferably at least 75%, and thereby does not significantly limit the view through the pane. For the HUD projection, it is sufficient in principle if the HUD region of the composite pane is provided with the reflective layer. However, because the reflective layer is also intended to reduce the energy input into the vehicle interior, the composite pane is preferably provided with the reflective layer over a large area. In an advantageous embodiment of the invention, at least 80% of the pane surface is provided with the reflective layer according to the invention. In particular, the reflective layer is applied over the entire pane surface with the exception of a peripheral edge region and optionally local regions, which are intended to ensure the transmittance of electromagnetic radiation through the composite pane as communication, sensor or camera windows, and therefore are not provided with the reflective layer. The peripheral uncoated edge region has, for example, a width of up to 20 cm. It prevents direct contact of the reflective layer with the surrounding atmosphere, so that the reflective layer in the interior of the composite pane is protected against corrosion and damage.

The projector is arranged on the interior side of the composite pane and irradiates the composite pane via the interior-side surface of the inner pane. It is directed toward the HUD region and irradiates it in order to generate the HUD projection. The radiation of the projector is at least partially p-polarised according to the invention and therefore has a p-polarised radiation portion. Preferably, the radiation of the projector is predominantly p-polarised, i.e., has a p-polarised radiation portion of greater than 50%. The higher the proportion of the p-polarised radiation relative to the total radiation of the projector, the greater the intensity level of the desired projection image, and the weaker the intensity of undesired reflections at the surfaces of the composite pane. The projector's p-polarised radiation portion is preferably at least 70%, particularly preferably at least 80%, and very particularly preferably at least 90%. In a particularly advantageous embodiment, the radiation from the projector is substantially purely p-polarised—the p-polarised radiation portion is 100% or deviates only insignificantly therefrom. The indication of the polarization direction refers to the plane of incidence of the radiation on the laminated pane. P-polarized radiation refers to a radiation the electric field of which oscillates in the plane of incidence. P-polarized radiation refers to a radiation the electric field of which oscillates perpendicular to the plane of incidence. The plane of incidence is spanned by the incident vector and the surface normal of the composite pane at a point within the HUD region, preferably in the geometric centre of the HUD region. Due to the usual pane curvature in the vehicle field, which affects the plane of incidence and thus the definition of the polarisation, the ratio of p-polarised radiation to s-polarised radiation can be different from this reference point at other locations.

The p-polarised radiation emitted by the projector irradiates the HUD region during operation of the HUDs for generating the HUD projection. The radiation of the projector is in the visible spectral range of the electromagnetic spectrum-typical HUD projectors work with the wavelengths 473 nm, 550 nm, and 630 nm (RGB). Because the angle of incidence typical for HUD projection arrangements is the Brewster angle for an air-glass transition (56.5° to 56.6°, soda-lime glass, $n_2$=1.51–1.52), p-polarised radiation is hardly reflected from the pane surfaces. Ghost images due to reflection at the interior-side surface of the inner pane and the outer-side surface of the outer pane therefore occur only with low intensity. In addition to preventing ghost images, the use of p-polarised radiation also has the advantage that the HUD image can be seen by wearers of polarisation-selective sunglasses which typically only allow p-polarised radiation to pass through and block s-polarised radiation.

The radiation of the projector preferably strikes the composite pane at an angle of incidence of 45° to 70°, in particular of 60° to 70°. In an advantageous embodiment, the angle of incidence deviates by at most 10° from the Brewster angle. The p-polarised radiation is then reflected only insignificantly at the surfaces of the composite pane, so that no ghost image is generated. The angle of incidence is the angle between the vector of incidence of the projector radiation and the interior-side surface normal (that is to say the surface normal on the interior-side external surface of the composite pane) at the geometric centre of the HUD region. Ideally, the angle of incidence should be as close as possible to this Brewster angle. However, angles of incidence of 65°, for example, can also be used, which are common for HUD projection arrangements, are easy to implement in vehicles and deviate only slightly from the Brewster angle so that the reflection of the p-polarized radiation increases only insignificantly.

Because the reflection of the projector radiation takes place substantially at the reflective layer and not at the external pane surfaces, it is not necessary to arrange the external pane surfaces at an angle to one another in order to prevent ghost images. In this case, the external pane surfaces are the surfaces of the individual panes facing away from one another, i.e., the outer-side surface of the outer pane and the interior-side surface of the inner pane. The external surfaces of the composite pane are therefore preferably arranged substantially parallel to one another. For this purpose, the thermoplastic intermediate layer is preferably not wedge-shaped, but has a substantially constant thickness, in particular also in the vertical course between the upper edge and the lower edge of the composite pane, just like the inner pane and the outer pane. By contrast, a wedge-like intermediate layer would have a variable, in particular increasing thickness in the vertical course between the lower edge and the upper edge of the composite pane. The intermediate layer is typically formed from at least one thermoplastic film. Because standard films are significantly more cost-effective than wedge films, the production of the composite pane is made more favourable.

The reflective layer can also be used as a heatable coating. For this purpose, it must be electrically contacted so that it can be connected to the voltage source, usually the on-board voltage of the vehicle. For connection to the voltage source, the coating is preferably provided with busbars, which can be connected to the poles of the voltage source in order to introduce current into the coating over as large a part of the pane width as possible. The busbars can be designed, for example, as printed and baked-in conductors, typically in the form of a baked screen printing paste with glass frits and silver particles. Alternatively, however, strips of an electrically conductive foil can also be used as busbars which are placed or glued onto the coating, for example copper foil or aluminium foil. Typically, the two busbars are positioned in the vicinity of two opposite side edges of the composite pane, for example the upper and lower edges.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes with a thickness in the range from 0.8 mm to 5 mm, preferably from 1.4 mm to 2.9 mm, are used, for example those with the standard thicknesses of 1.6 mm or 2.1 mm.

The outer pane, the inner pane and the thermoplastic intermediate layer can be clear and colourless, but also tinted or coloured. In a preferred embodiment, the total transmittance through the composite pane (together with reflective layer) is greater than 70% relative to the light type A, in particular when it is designed as a windscreen. The term total transmittance relates to the method defined by ECE-R 43, Annex 3, § 9.1 for testing the light transmittance of motor vehicle panes. Independently of each other the outer pane and the inner panes can be not prestressed, partially prestressed or prestressed. If at least one of the panes should be prestressed, this can be thermal or chemical prestressing.

In an advantageous embodiment, the outer pane is tinted or coloured. This can reduce the outer-side reflectivity of the composite pane, making the pane appear more pleasant to an outside viewer. However, in order to ensure the prescribed light transmittance of 70% (total transmittance), the outer pane should preferably have a light transmittance of at least 80%, particularly preferably at least 85% if the composite pane is to be used as a windscreen. The inner pane and the intermediate layer are preferably clear, i.e., not tinted or coloured. For example, green or blue-coloured glass can be used as the outer pane.

The laminated pane is preferably curved in one or more spatial directions, as is usual for motor vehicle panes, wherein the typical radii of curvature are in a range of approximately 10 cm to approximately 40 m. However, the laminated pane can also be flat, for example if it is provided as a pane for buses, trains or tractors.

The thermoplastic intermediate layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The intermediate layer is typically formed from at least one thermoplastic film, in particular from a film based on PVB, EVA or PU. Apart from the polymer, the film can contain further additives, in particular plasticisers. The thickness of the intermediate layer is preferably from 0.2 mm to 2 mm, particularly preferably from 0.3 mm to 1 mm.

The laminated pane can be produced by methods known per se. The outer pane and the inner pane are laminated together via the intermediate layer, for example by autoclave processes, vacuum bag processes, vacuum ring processes, calendering processes, vacuum laminators, or combinations thereof. The outer pane and inner pane are usually connected under the effect of heat, vacuum and/or pressure.

The reflective layer is preferably applied to an inner pane or an outer pane by physical vapour deposition (PVD), particularly preferably by cathode sputtering, very particularly preferably by magnetic-field-assisted cathode sputtering ("magnetron sputtering"). In principle, however, the coating may also be applied, for example, by means of chemical vapour deposition (CVD), e.g., plasma-enhanced chemical vapour deposition (PECVD), by evaporation deposition, or by atomic layer deposition (ALD). The coating is preferably applied to the panes before the lamination. Instead of applying the reflective layer to a pane surface, it can in principle also be provided on a carrier film which is arranged in the intermediate layer.

If the composite pane is to be curved, the outer pane and the inner pane are preferably subjected to a bending process before lamination and preferably after any coating processes. Preferably, the outer pane and the inner pane are curved together congruently (i.e., simultaneously and by the same tool) because this optimally matches the shape of the panes to one another for the subsequent lamination. Typical temperatures for glass-bending processes are, for example, 500° C. to 700° C. This thermal treatment also increases transparency and reduces the sheet resistance of the reflective layer.

The invention also comprises the use of a composite pane designed according to the invention as a projection surface of a projection arrangement for a head-up display, wherein directed toward the HUD region is a projector, the radiation of which is at least partially, in particular predominantly, preferably essentially completely p-polarised. The preferred embodiments described above apply accordingly to use.

The invention further comprises the use of a projection arrangement according to the invention as an HUD in a vehicle on land, on water or in the air, preferably a motor vehicle, rail vehicle, aircraft, or ship, in particular a passenger car or lorry.

In the following, the invention is explained in more detail with the aid of a drawing and examples of embodiments. The drawing is a schematic representation and is not true to scale. The drawing does not limit the invention in any way.

Figure 2:
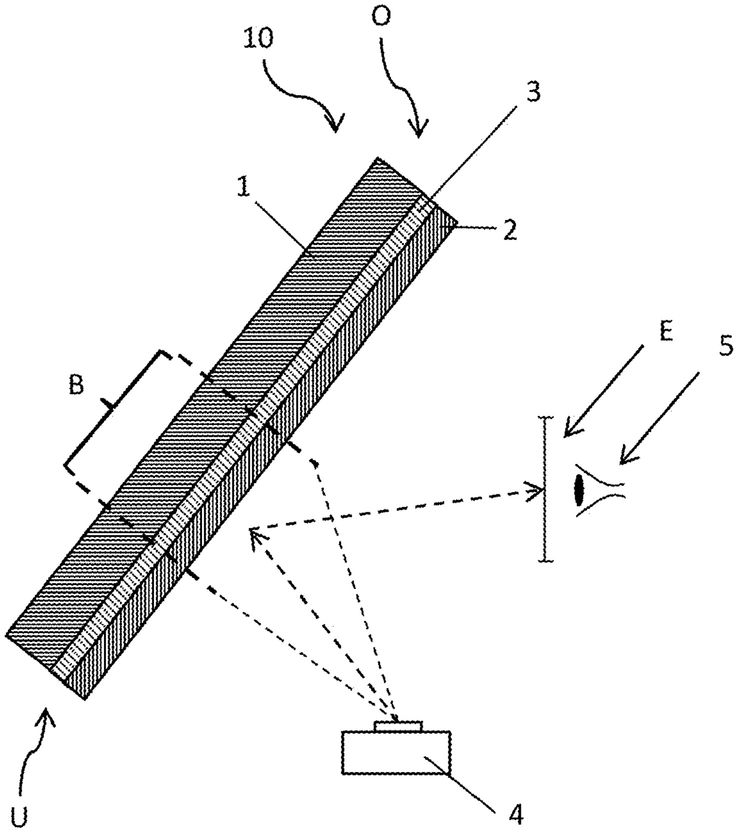
Figure 3:
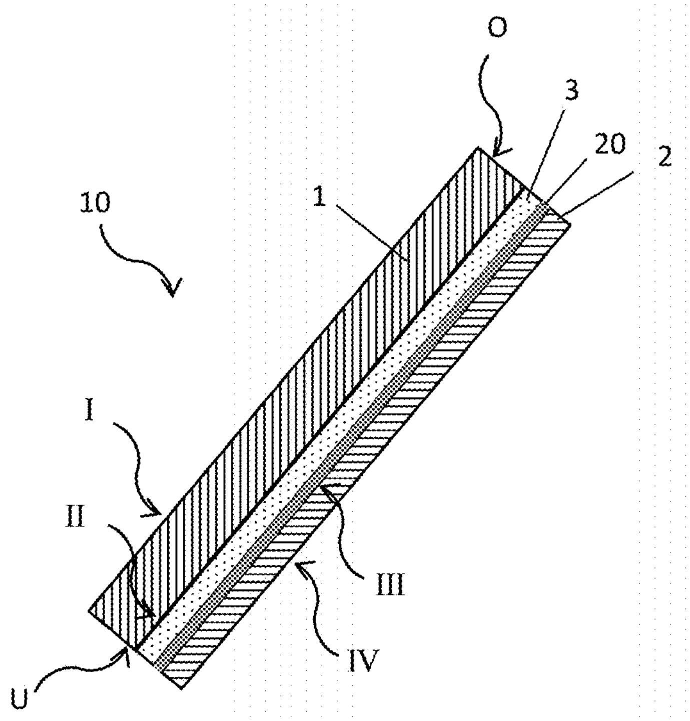
Figure 4:
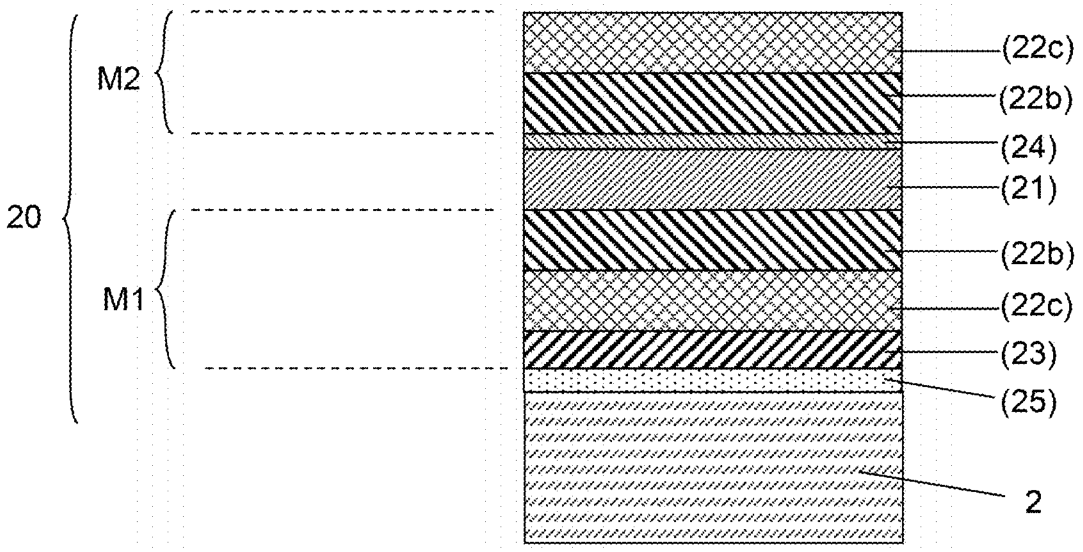
Figure 5:
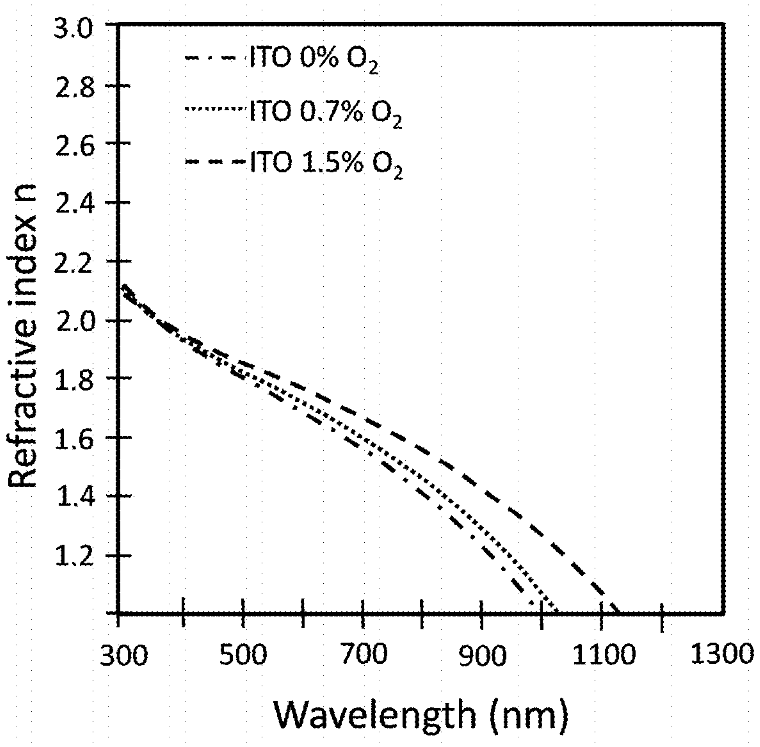

In the figures:

FIG. 1 shows a plan view of a composite pane of a generic projection arrangement, FIG. 2 shows a cross-section through a generic projection arrangement, FIG. 3 shows a cross-section through a composite pane of a projection arrangement according to the invention, FIG. 4 shows a cross-section through an embodiment of the reflective layer according to the invention on an inner pane, and FIG. 5 shows a diagram of the refractive indices of ITO layers as a function of the wavelength.

FIG. 1 and FIG. 2 each show a detail of a generic projection arrangement for an HUD. The projection arrangement comprises a composite pane 10, in particular the windscreen of a passenger vehicle. The projection arrangement also comprises an HUD projector 4, which is directed toward a region of the composite pane 10. In this region, which is usually referred to as HUD region B, images can be generated by the HUD projector 4, which images are perceived by a viewer 5 (vehicle driver) as virtual images on the side of the composite pane 10 facing away from him when his eyes are located within the so-called eye box E.

The laminated pane 10 is constructed from an outer pane 1 and an inner pane 2, which are connected to one another via a thermoplastic intermediate layer 3. Its lower edge U is arranged downward in the direction of the engine of the passenger vehicle, its upper edge O is arranged at the top in the direction of the roof. In the installed position, the outer pane 1 faces the external environment; the inner pane 2 faces the vehicle interior.

FIG. 3 shows an embodiment of a composite pane 10 formed according to the invention. The outer pane 1 has an outer-side surface I which, in the installed position, faces the external environment, and an interior-side surface II which faces the interior in the installed position. Likewise, the inner pane 2 has an outer-side surface III which faces the external environment in the installed position, and an interior-side surface IV which faces the interior in the installed position. The outer pane 1 and the inner pane 2 consist, for example, of soda lime glass and have, for example, a thickness of 2.1 mm in each case. The intermediate layer 3 is formed, for example, from a PVB film with a thickness of 0.76 mm. The PVB film has a substantially constant thickness, apart from any surface roughness that is customary in the art; it is not designed as a so-called wedge film.

The outer-side surface III of the inner pane 2 is provided with a reflective layer 20 according to the invention, which is provided as a reflective surface for the projector radiation. The reflective layer 20 should also serve as a sun protection layer and reduce the energy input into the vehicle interior, which is caused in particular by the infrared radiation components of the sunlight.

According to the invention, the radiation of the projector 4 is p-polarised, in particular substantially purely p-polarised. Because the HUD projector 4 irradiates the windscreen 10 with an angle of incidence of approximately 65°, which is close to the Brewster angle, the radiation of the projector is reflected only to an insignificant extent at the external surfaces I, IV of the composite pane 10. The reflective layer 20 according to the invention, on the other hand, is optimized for the reflection of p-polarised radiation. It serves as a reflective surface for the radiation of the HUD projector 4 for generating the HUD projection.

FIG. 4 shows the layer sequence of an embodiment of the reflective layer 20 according to the invention on the inner pane 2. The reflective layer 20 is a stack of thin layers. The reflective layer 20 comprises exactly one electrically conductive layer 21 based on silver. A blocker layer 24 is arranged directly above the electrically conductive layer 21. A first layer module M1 is arranged below the conductive layer 21. A second layer module M2 is arranged above the conductive layer 21 with the blocker layer 24. A barrier layer 25 is arranged below the first layer module M1, between first layer module M1 and inner pane 2 and prevents the diffusion of oxygen from the inner pane 2 into the first layer module M1.

The first layer module M1 consists of a dielectric layer sequence and a single layer 23 based on a TCO. The layer 23 improves the IR reflectivity of the composite pane 10, so that the energy input into the vehicle interior can be further reduced. Furthermore, a reflective layer 20 can be realized with the layer 23 and has excellent reflective properties with respect to the p-polarised radiation of the HUD projector 4, so that a strong intensity and colour-neutral representation of the HUD projection is ensured. These are great advantages of the reflective layer 20 according to the invention with the TCO layer 23. The layer 23 is attached directly to the barrier layer 23, i.e., provided as the lowermost layer of the first layer module M1, above which the dielectric layer sequence of the first layer module M1 follows. The dielectric layer sequence of the first layer module M1 consists from bottom to top of a refraction-index-enhancing layer 22*c* and a matching layer 22*b*.

The second layer module M2 is designed as a dielectric layer sequence, wherein the layer sequence consists from bottom to top in this order of a matching layer 22*b* and a refraction-index-enhancing layer 22*c*.

The layer sequence can be seen schematically in the figure. The layer sequence of a composite pane 10 with the reflective layer 20 on the outer-side surface III of the inner pane 2, together with the materials and layer thicknesses of the individual layers, is shown in Table 1 for four examples B1 to B5 according to the invention which differ in the individual layer thicknesses. The dielectric layers can be doped independently of one another, for example with boron or aluminium. The TCO layer 23 provided as an ITO layer is deposited with an oxygen content of approximately 0% in the process gas by means of magnetic-field-assisted cathode sputtering. The layer sequences of examples B1 to B5 are applied to the outer-side surface III of the inner pane 2. The inner pane 2 has a thickness of 2.1 mm in each case and is joined via the outer-side surface III, on which the reflective layer is located, via a PVB film with a thickness of 0.76 mm to the outer pane 1 with a thickness of 2.1 mm. The inner pane 2 and the outer pane 1 consist of soda-lime glass. Table 2 shows comparative examples V1 to V4 according to the invention, wherein a composite pane according to comparative examples has the identical basic structure to the examples according to the invention, but differs in the structure of the reflective layer.

The optical thickness of a layer results in each case as a product of the geometric thickness shown in the tables and the refractive index (SiN: 2.0; SiZrN: 2.2, ZnO: 2.0).

TABLE 1

| Examples according to the invention | | | | | | | | |
|---|---|---|---|---|---|---|---|---|
| | | | | Layer thicknesses in nm | | | | |
| Material | Reference signs | | | B1 | B2 | B3 | B4 | B5 |
| SiN | 20 | M2 | 22a | 5 | 5 | 5 | | |
| SiZr 17% | | | 22c | 31 | | | | |
| SiZr 27% | | | 22c | | 30 | | 34 | 36 |
| SnZnO | | | 22c | | | 10 | | |
| $TiO_x$ | | | 22b | | | 27 | 5 | 5 |
| ZnO | | | 22b | 5 | 5 | | | |
| $NiCrO_x$ | 24 | | | 1 | 1 | | | |
| Ag | 21 | | | 13.8 | 15.1 | 14.6 | 15.7 | 15.4 |
| ZnO | | M1 | 22b | 5 | 5 | 5 | 5 | 5 |
| SiZrN 27% | | | 22c | | 36 | 40 | 38 | 30 |
| SiZrN 17% | | | 22c | 37 | | | | |
| SiN | | | 22a | | | | | 11 |
| ITO | | | 23 | 70 | 87 | 70 | 88 | 72 |
| SiN | 25 | | | | | | | 5 |
| Soda-lime glass | 2 | | | 2.1 mm | 2.1 mm | 2.1 mm | 2.1 mm | 2.1 mm |

Comparative examples V1 to V5 are shown in Table 2. Like examples B1 to B5 according to the invention, the reflective layers of the comparative examples also comprise individual silver layers 21 and two layer modules M1, M2. Both layer modules M1, M2 are designed as dielectric layer sequences and each comprise an anti-reflective layer 22*a*, a refractive-index-enhancing layer 22*c*, and a matching layer 22*b*. The layer modules M1, M2 of the comparative examples do not comprise any TCO layers 23.

TABLE 2

| Comparative examples not according to the invention | | | | | | |
|---|---|---|---|---|---|---|
| | | Layer thicknesses in nm | | | | |
| Material | Reference signs | V1 | V2 | V3 | V4 | V5 |
| SiN | 20 M2 22a | | 19 | 17 | | |
| SiZr 17% | 22c | 56 | | | | 53 |
| SiZr 27% | 22c | | 39 | | 51 | |
| SnZnO | 22c | | | 11 | | |
| $TiO_x$ | 22b | | | 7 | 5 | |
| ZnO | 22b | 5 | 5 | | | 5 |
| $NiCrO_x$ | 24 | 1 | 1 | | | 1 |
| Ag | 21 | 11.7 | 13.0 | 12.2 | 13.4 | 13.8 |
| ZnO | M1 22b | 5 | 5 | 5 | 5 | |
| SiZrN 27% | 22c | | 16 | | 13 | |
| SiZrN 17% | 22c | 3 | | 60 | | 20 |
| SiN | 22a | 24 | 10 | 2 | 15 | 17 |
| ITO | 23 | | | | | |
| SiN | 25 | | | | | |
| Soda-lime glass | 2 | 2.1 mm | 2.1 mm | 2.1 mm | 2.1 mm | 2.1 mm |

Table 3 summarizes some characterising parameters of examples B1 to B5 and of comparative examples V1 to V5. Compared are:

- TL (A): integrated light transmittance in accordance with ISO 9050, measured with a light source of light type A
- TTS: total solar energy radiated in accordance with ISO 13837
- R(A)p-pol: integrated light reflection with respect to p-polarised radiation, measured with a p-polarised light source of light type A at an angle of incidence of 65° and a viewing angle of 65° relative to the surface normal on the interior side
- a*(A)p-pol, b*(A)p-pol: colour values in the L*a*b* colour spectrum as reflection colour with respect to p-polarised radiation, measured with a p-polarised light source of light type A at an angle of incidence of 65° and a viewing angle of 65° relative to the surface normal on the interior side The light transmittance TL (A) is a measure of the transparency of the composite pane 10, wherein values greater than 70% are desirable in particular for windscreens. The radiated solar energy TTS is a measure of the energy input into the vehicle interior and thus for the thermal comfort. R (A) p-pol is a measure of the reflectivity relative to the radiation of the HUD projector 4 and thus the intensity of the HUD projection. The colour values in the L*a*b* colour spectrum are a measure of how colour-neutral the HUD display is, wherein the values should be as close as possible to zero.

TABLE 3

| | TL(A)/% | TTS/% | R(A)p-pol/% | a*(A)p-pol | b*(A)p-pol |
|---|---|---|---|---|---|
| B1 | 72.5 | 53.2 | 17.1 | 0.7 | −0.6 |
| B2 | 72.5 | 52.3 | 17.9 | 0.3 | −0.1 |
| B3 | 72.5 | 53.2 | 17.3 | 0.9 | −1.3 |
| B4 | 72.5 | 52.1 | 18.7 | 0.6 | −0.4 |
| B5 | 72.5 | 52.9 | 18.5 | 0.8 | −1.0 |
| V1 | 72.5 | 59.6 | 17.3 | 1.1 | −1.0 |
| V2 | 72.5 | 58.5 | 17.7 | 1.5 | −0.1 |
| V3 | 72.5 | 59.2 | 17.1 | 1.2 | −2.2 |
| V4 | 72.5 | 58.3 | 18.6 | 1.1 | −2.0 |
| V5 | 72.5 | 56.3 | 19.4 | 2.9 | −0.7 |

From Table 3 it is clear that all examples and also the comparative example have a sufficiently high light transmittance TL (A), so that the laminated panes 10 can be used as windscreens. In contrast to the comparative example, the inventive examples have a significantly lower TTS value-due to the TCO layer 23, which is integrated in the first layer module M1, the irradiated solar energy is significantly reduced and the thermal comfort in the vehicle is increased. Surprisingly, a high degree of reflection that is comparable to the comparative example can nevertheless be achieved with respect to the p-polarised radiation of the HUD projector 4, so that the laminated panes 10 are suitable as a projection surface of a generic HUD projection arrangement.

The introduction of a TCO layer 23 made of ITO within the first layer module M1 leads to a reduction in the total solar transmittance TTS by approximately 6%. This is accompanied by a reduction in the energy transmittance (TE) by a similar amount (approximately 7%). Furthermore, the external energetic reflection increases by about 3-4%, and the external energetic absorption by about 2-3%. The increase in energetic absorption is attributable to the absorption of the ITO layer in the infrared range of the spectrum. The reflective layers with ITO have a greater energetic reflection, which is attributable to a greater thickness of the silver layers in coatings comprising an ITO layer. The inventors have found that the presence of the ITO layer and the preferred positioning of the ITO layer as the furthest inward layer within the first layer module (M1) are advantageous in order to achieve as neutral a colouring as possible even in the case of comparatively thick silver layers. This positive influence of the layer 23 on the colouring of the layers is also illustrated using a comparison of example 1 to comparative example 5. Comparative example 5 and example 1 both comprise a silver layer having a thickness of 13.8 nm, wherein comparative example 5 does not contain a TCO layer 23, and example 1 contains an ITO layer as TCO layer 23. In comparative example 5, a TTS value of 56.3% is achieved; in example 1 the TTS value is 53.2%. In comparative example 5, undesirably high colour values occur, whereas in example 1 a neutral colour results.

The use of ITO layers within the first layer module M1 thus improves the IR absorption and increases the energy absorption, which leads to a smaller total solar transmittance TTS. Furthermore, the production of reflective layers with thicker silver layers is made possible while maintaining the colour neutrality. Reflective layers with thicker silver layers in turn have a higher energetic reflection. The greater energetic absorption and reflection of the reflective layers comprising an ITO layer in module M1 both contribute to improving the total solar transmittance (TTS). The inventors have found that ITO layers in this context are particularly advantageous as layer 23, but this effect can also be achieved by means of other transparent conductive oxides.

FIG. 5 shows the refractive indices of a plurality of TCO layers 23 as a function of the wavelength. The TCO layers 23 are designed as ITO layers which are deposited by means of magnetic-field-assisted cathode sputtering. In each case no oxygen (curve ITO 0% $O_2$), 0.7% oxygen (curve ITO 0.7% $O_2$) and 1.5% oxygen (curve ITO 1.5% $O_2$) was added to the process gas. The refractive indices were each determined by means of ellipsometry. TCO layers, which, at a wavelength of 550 nm, have a refractive index of from 1.6 to 2.0, preferably from 1.7 to 1.9, particularly preferably from 1.7 to 1.8, have proven to be particularly advantageous. The refractive index of the TCO layers preferably decreases continuously with increasing wavelength.

LIST OF REFERENCE SIGNS (10) Composite pane
(1) Outer pane
(2) Inner pane
(3) Thermoplastic intermediate layer
(4) HUD projector
(5) Viewer/vehicle driver
(20) Reflective layer
(21) Electrically conductive layer/silver layer
(22*a*) Anti-reflective layer
(22*b*) Matching layer
(22*c*) Refractive-index-enhancing layer
(23) Layer based on a transparent conductive oxide (TCO)
(24) Blocker layer
(25) Barrier layer
(M1) First layer module
(M2) Second layer module
(O) Upper edge of the windscreen 10
(U) Lower edge of the windscreen 10
(B) HUD region of the windscreen 10
(E) Eye box
(I) Outer-side surface of the outer pane 1 facing away from the intermediate layer 3
(II) Interior-side surface of the outer pane 1 facing the intermediate layer 3
(III) Outer-slide surface of the inner pane 2 facing the intermediate layer 3
(IV) Interior-side surface of the inner pane 2 facing away from the intermediate layer 3

The invention claimed is:

1. A projection arrangement for a head-up display (HUD), comprising:
- a composite pane, comprising an outer pane and an inner pane, which are connected to one another via a thermoplastic intermediate layer and having an HUD region; and
- an HUD projector, which is directed toward the HUD region;
- wherein
- a radiation of the projector is at least partially p-polarised, and
- the composite pane is provided with a reflective layer which is suitable for reflecting p-polarised radiation;
- and wherein
- the reflective layer comprises precisely one electrically conductive layer based on silver, which electrically conductive layer is arranged in a planar manner between a first layer module and a second layer module,
- the first layer module is a layer module of the reflective layer closest to the HUD projector,
- the first layer module and the second layer module comprise dielectric layers or layer sequences, and
- at least the first layer module contains at least one layer based on a transparent conductive oxide.

2. The projection arrangement according to claim 1, wherein the at least one layer based on a transparent conductive oxide contains indium tin oxide (ITO), indium zinc mixed oxide (IZO), fluorine-doped tin oxide ($SnO_2$:F), aluminium-doped zinc oxide (ZnO:Al), gallium-doped zinc oxide (ZnO:Ga), antimony-doped tin oxide (ATO, $SnO_2$:Sb) and/or niobium-doped titanium oxide ($TiO_2$:Nb).

3. The projection arrangement according to claim 2, wherein the at least one layer (based on a transparent conductive oxide contains indium tin oxide (ITO) and is deposited by physical vapour deposition with an oxygen content of 0% volume fraction to 5% volume fraction in the process gas.

4. The projection arrangement according to claim 1, wherein the reflective layer directly adjacent to the layer based on a transparent conductive oxide comprises at least one dielectric barrier layer that inhibits diffusion of oxygen.

5. The projection arrangement according to claim 1, wherein the first layer module comprises dielectric layers or layer sequences and a layer based on a transparent conductive oxide, and the second layer module comprises dielectric layers or layer sequences and no layers based on a transparent conductive oxide.

6. The projection arrangement according to claim 1, wherein at least the first layer module comprises dielectric layers or layer sequences and a layer based on a transparent conductive oxide, and the layer based on a transparent conductive oxide is the layer of the first layer module closest to the HUD projector.

7. The projection arrangement according to claim 1, wherein the reflective layer is arranged on a surface facing the thermoplastic intermediate layer (II, III) of the outer pane or of the inner pane or within the thermoplastic intermediate layer.

8. The projection arrangement according to claim 1, wherein a blocker layer is arranged between the electrically conductive layer and the adjacent first or second layer module with a thickness of less than 1 nm.

9. The projection arrangement according to claim 1, wherein a thickness of the electrically conductive layer is at least 12 nm and at most 25 nm.

10. The projection arrangement according to claim 1, wherein a thickness of the at least one layer based on the transparent conductive oxide is from 20 nm to 150 nm.

11. The projection arrangement according to claim 1, wherein an optical thickness of the dielectric layers or layer sequences is from 30 nm to 150 nm.

12. The projection arrangement according to claim 1, wherein the dielectric layers or layer sequences comprise one or more of the following layers:
- an anti-reflective layer with a refractive index of at least 1.9,
- a refractive-index-enhancing layer with a refractive index of at least 2.1,
- a dielectric matching layer for improving reflectivity of the electrically conductive layer based on silver.

13. The projection arrangement according to claim 1, wherein the composite pane with the reflective layer has an integrated light reflection with respect to p-polarised radiation of at least 15%, measured with a p-polarised light source of the light type A at an angle of incidence of 65° and a viewing angle of 65° to a surface normal of the surface facing away from the thermoplastic intermediate layer of the inner pane.

14. The projection arrangement according to claim 1, wherein the outer pane is tinted or coloured and has a light transmittance of at least 80%.

15. A method comprising providing a projection arrangement according to claim 1 as HUD in a vehicle on land, on water or in the air.

16. The projection arrangement according to claim 3, wherein the oxygen content is less than 1% volume fraction in the process gas.

17. The projection arrangement according to claim 10, wherein the thickness of the at least one layer based on the transparent conductive oxide is from 60 nm to 100 nm.

18. The projection arrangement according to claim 12, wherein:

the anti-reflective layer is based on silicon nitride, the refractive-index-enhancing layer is based on a silicon-metal mixed nitride, the dielectric matching layer is based on zinc oxide.

19. The projection arrangement according to claim 18, wherein the refractive-index-enhancing layer is a layer of silicon-zirconium mixed nitride, silicon titanium mixed nitride or silicon hafnium mixed nitride.

20. The method according to claim 15, wherein the vehicle is a motor vehicle, a rail vehicle, an aircraft, or a ship.

* * * * *